April 6, 1954    W. E. HAMMOND ET AL    2,674,442
ENVELOPE TYPE RADIAL SEAL FOR REGENERATIVE HEAT EXCHANGERS
Filed Oct. 12, 1950
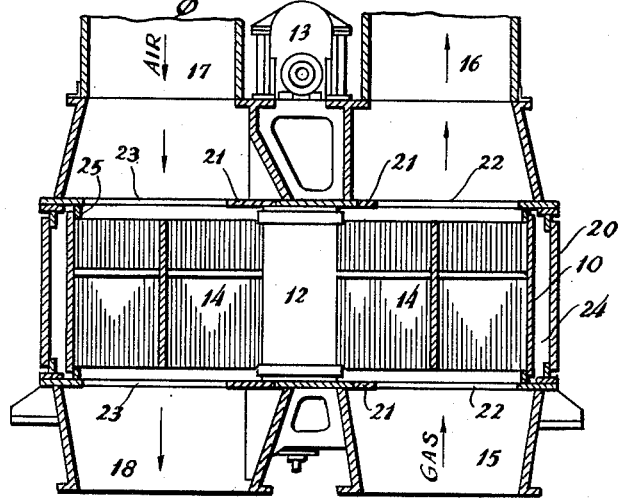
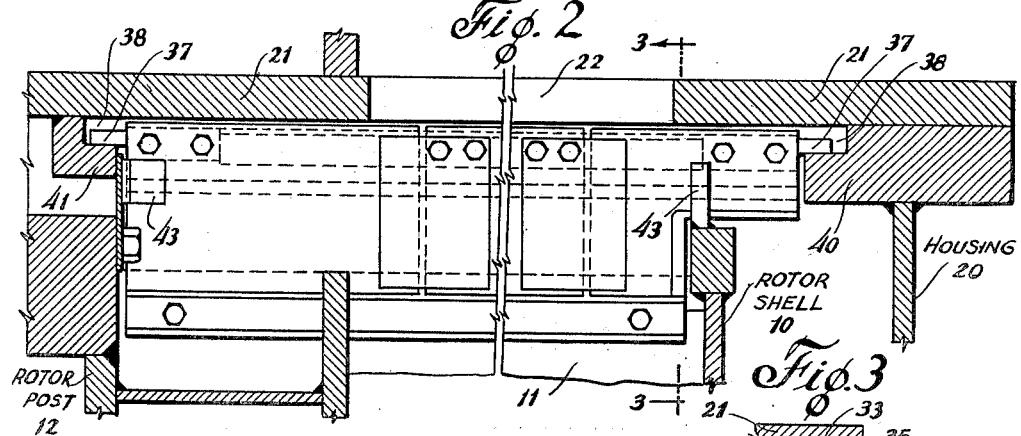
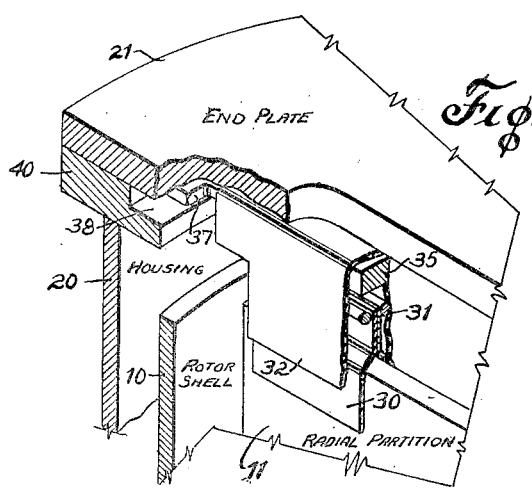
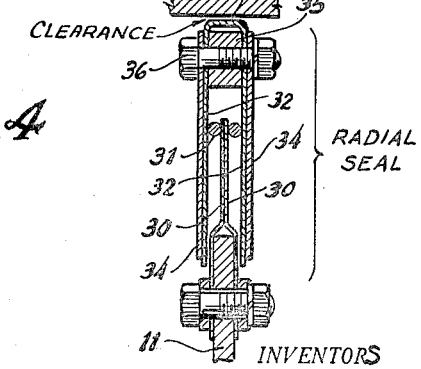
INVENTORS
William E. Hammond
John A. Lidford
BY
ATTORNEY Patented Apr. 6, 1954

2,674,442

UNITED STATES PATENT OFFICE 2,674,442

ENVELOPE TYPE RADIAL SEAL FOR REGENERATIVE HEAT EXCHANGERS

William E. Hammond, Wellsville, and John A. Lidford, Friendship, N. Y., assignors to The Air Preheater Corporation, New York, N. Y.

Application October 12, 1950, Serial No. 189,756

2 Claims. (Cl. 257—6)

The present invention relates to improved radial seals for use between the rotor and the end plates of the housing enclosing a rotary regenerative air preheater or similar apparatus.

In a rotary regenerative heater of the Ljungstrom type a cylindrical rotor has compartments carrying heat transfer material which as the rotor turns is first exposed to heating gases and then disposed in the air passage to impart the absorbed heat to the air. The rotor is surrounded by a housing having end or sector plates formed with openings to provide for the flow of gas and air. To prevent the mingling of the two fluids the partitions forming the rotor compartmens are provided with radial seals that cooperate with the imperforate portions of the sector plates, or vice versa.

The present invention contemplates constructing the radial seals with parts that maintain a slight predetermined clearance with the sector plates despite relative axial movements of the rotor due to non-uniform expansion or contraction of the rotor and housing parts. The invention will be best understood upon consideration of the following detailed description of an illustrative embodiment thereof when read in conjunction with the accompanying drawings in which:

Figure 1 is a sectional elevational view in diagrammatic form of a rotary regenerative air preheater embodying the present invention.

Figure 2 is a broken away view on an enlarged scale showing the relationship between a radial seal and the end or sector plate at one side of the rotor.

Figure 3 is a fragmentary sectional view on an enlarged scale as seen on the line 3—3 of Figure 2 illustrating one of the radial seals in cooperative relation with the partitions that divide the rotor into compartments carrying heat transfer plates.

Figure 4 is a fragmentary perspective view illustrating the manner in which the envelope type seals on the radial partitions are maintained in sealing relation with the end plates.

In the drawings the numeral 10 designates the cylindrical shell of a rotor divided into sector shaped compartments by radial partitions 11 connecting it with the rotor post 12 which is driven by a motor and reduction gearing 13 to turn the rotor slowly about its axis. The rotor compartments contain regenerative heat transfer material in the form of closely spaced metallic plates 14 which first absorb heat from hot gases entering the preheater through a duct 15 from a boiler or other source to be discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through duct 18.

A housing 20 enclosing the rotor 10 is provided at either end opposite the latter with end or sector plates 21 which are apertured at 22 and 23 to admit and discharge streams of gas and air flowing through the preheater. In order that the streams of gas and air may not commingle, a portion of the rotor at least equal to but usually somewhat greater in circumferential extent than one rotor compartment must be isolated or blocked off between the gas and air passages. So that the streams of gas and air may not by-pass the heat transfer surface 14 by flowing in the annular clearance space 24 between the rotor shell 10 and the housing 20 it is customary to provide circumferential seals indicated diagrammatically at 25 on the shell 10 which wipe against confronting parts of the sector plates 21 or allied parts so as to seal off the space 24 at both ends of the rotor.

In accordance with the present invention the radial seal consists of two cooperating parts one of which is secured to the partitions of the rotor while the other is supported on the stationary housing but moves with the rotor. As illustrated in Figure 3 there are mounted along the upper and lower edges of each partition 11 a pair of flexible sealing leaves 30 projecting therefrom into the spaces between the ends of the rotor and the sector plates but not extending as far as the latter. These leaves 30 are bent from the sides of partition 11 into back to back relation in the vertical medial plane of the partition 11. The sealing leaves 30 are provided with wear rods 31 contacting the inner side walls of U-shaped envelope members 32 into which they extend. The envelopes 32 form a close but flexible fit with the sealing leaves 30 and their outer end surfaces 33 are maintained in vertical positions in predetermined spaced relation to the underside of the end plates. The seals are close enough to the underside of the end plates to be effective for preventing gas and air flow across the ends of the rotor but do not wipe on the end plates as is the case with earlier seals. Along their radial ends or faces the envelopes have therewithin a bar 35 which acts as a strength member as well as a connecting piece between the sides of the envelope. As is shown in Figure 2 each envelope is provided at its inner and outer radial ends with a wear shoe 37, these riding in grooves 38 formed in members located on the faces of the end plates 21 facing the rotor; as for example, on the housing flanges 40 on which the sector plate is mounted and on circumferential members 41 attached to the inner surfaces of the sector plates 42 adjacent the rotor post 12. With this construction the envelopes 33 are always maintained close to (but out of contact with) the end plates 21 in proper sealing relation thereto, and the sealing leaves 30 may ride up and down within the envelopes to accommodate axial movements of the rotor, such as are due to expansion or contraction. The envelopes though supported on stationary parts of the housing are carried along with the rotor by the drive brackets 43 attached to the rotor shell 10 near the outer ends of the envelopes and at the inner ends of the envelopes on the rotor post 12, or adjacent the latter on the related partition 11.

What we claim is:

1. In a regenerative air preheater or the like having a rotor made up of a cylindrical shell joined to a rotor post by radial partitions forming compartments that carry heat transfer material, and a housing surrounding the rotor and provided opposite the latter with end plates including imperforate portions located between circumferentially spaced apertures formed in said plates for the flow of heating gases and air to and through the regenerative material carried by the rotor; radial sealing members between said partitions and the imperforate portions of said plates comprising; sealing leaves attached to said radial partitions and projecting axially of the rotor into the space between the rotor and said end plates with their radially extending edges spaced from said end plates; sealing envelopes formed U-shape in transverse cross section to receive and fit over said radially extending edges of said leaf seals; means forming circumferential tracks on said housing and end plates adjacent the ends of the rotor; and means mounted at the radially inner and outer ends of said envelopes engageable with said tracks for supporting said sealing envelopes independently of said leaf seals and maintaining the outer radially extending surfaces of said envelopes at a predetermined spacing from said end plates.

2. In a regenerative air preheater or the like having a rotor made up of a cylindrical shell joined to a rotor post by radial partitions forming compartments that carry heat transfer material, and a housing surrounding the rotor and provided opposite the latter with end plates including imperforate portions located between circumferentially spaced apertures formed in said plates for the flow of heating gases and air to and through the regenerative material carried by the rotor; radial sealing members between said partitions and the imperforate portions of said plates comprising; flexible sealing leaves attached to said radial partitions and projecting axially of the rotor into the space between the rotor and said end plates with their radially extending edges out of contact with said end plates; sealing envelopes formed U-shape in transverse cross section to receive and fit over said radially extending edges of said leaf seals with the latter contacting the sides of said envelopes; means forming circumferential tracks on said housing and said end plates closely adjacent the ends of the rotor; and means mounted at the radially inner and outer ends of said envelopes engageable with said tracks for supporting said sealing envelopes independently of said leaf seals in a position to maintain the outer radially extending surfaces of said envelopes at a predetermined spacing from said end plates.

References Cited in the file of this patent

UNITED STATES PATENTS

| Number | Name | Date |
|---|---|---|
| 1,652,025 | Ljungstrom | Dec. 6, 1927 |
| 2,229,691 | Boestad | Jan. 28, 1941 |
| 2,287,777 | Boestad | June 30, 1942 |
| 2,428,041 | Saywell | Sept. 30, 1947 |
| 2,471,995 | Yerrick et al. | May 31, 1949 |
| 2,517,512 | Tigges et al. | Aug. 1, 1950 |
| 2,549,656 | Yerrick et al. | Apr. 17, 1951 |